H. L. PITMAN.
COMBINED TYPE WRITING AND COMPUTING MACHINE.
APPLICATION FILED NOV. 27, 1914.
1,263,339.
Patented Apr. 16, 1918.
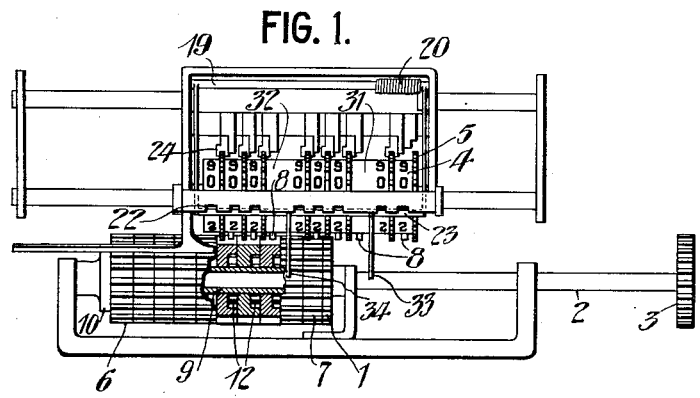
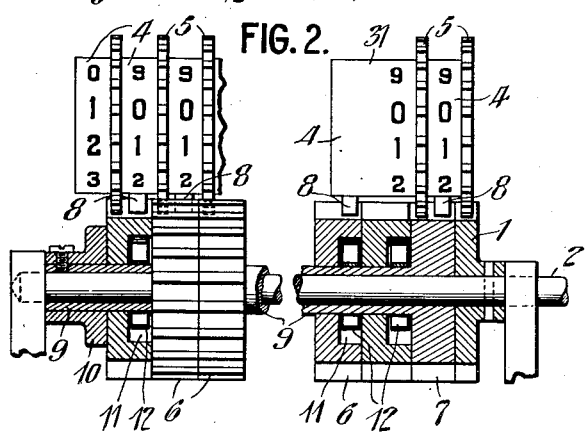
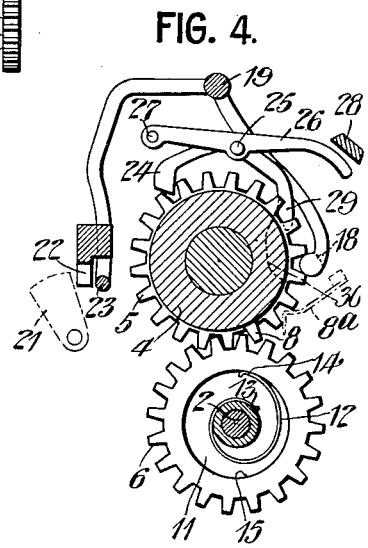
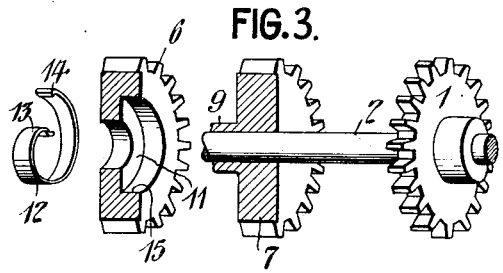
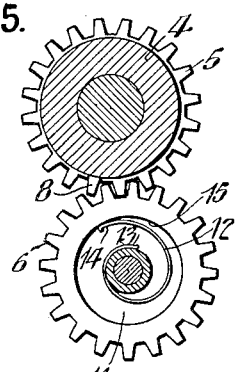
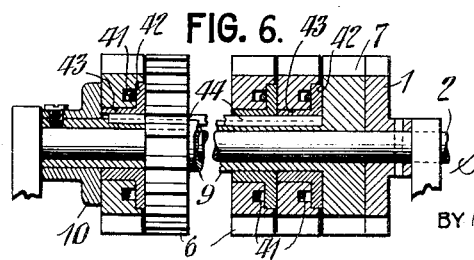
WITNESSES:
INVENTOR:
Henry L. Pitman
BY
ATTORNEY.

UNITED STATES PATENT OFFICE.

HENRY L. PITMAN, OF EAST ORANGE, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,263,339.  Specification of Letters Patent.  Patented Apr. 16, 1918.

Application filed November 27, 1914.  Serial No. 874,127.

*To all whom it may concern:*

Be it known that I, HENRY L. PITMAN, a citizen of the United States, residing in East Orange, in the county of Essex and State of New Jersey, have invented certain new and useful Improvements in Combined Type-Writing and Computing Machines, of which the following is a specification.

This invention relates to computing machines, particularly combined typewriting and computing machines, and is illustrated for convenience as applied to the machine illustrated in Patent No. 1,045,434, granted to me November 26, 1912. One feature of the invention relates to the carry-over mechanism, whereby tens are either carried or borrowed.

The principal object of the present invention is to provide simple and effective means for carrying over, particularly when provision must be made for carrying simultaneously along a large number of wheels. It is sometimes desirable that there should be a certain looseness and play between the parts; but when this play is multiplied throughout a long series of wheels, the last wheel is liable not to be sufficiently rotated. Any ordinary carry-over mechanism will answer for carrying tens simultaneously along five number wheels, or even six with suitable spring detents or justifiers; but it is often desired to employ as many as nine number wheels in a totalizer; and one of the objects of this invention is to provide a carry-over mechanism which will prove efficient for a totalizer having nine or even more wheels.

As shown in said patent, a master wheel is provided for a set of computing wheels, and provision is made for relative step-by-step movement between the master wheel and the computing wheels. The carrying-over according to the present invention is effected by means of a gang of idle pinions, which are associated with the master wheel in such a way that a relative step-by-step movement is produced between the gang of computing wheels on the one hand, and the master wheel with a gang of carry-over pinions on the other hand; the carry-over pinion adjacent the master wheel being integral with a sleeve on which the other carry-over pinions are frictionally mounted; the sleeve in turn is loosely supported on the same shaft which carries and drives the master wheel. Each number wheel has a single carry-over tooth, which once in each revolution engages one of the carry-over pinions, thereby rotating the same one point; and this carry-over pinion in its turn rotates the next higher number wheel one point, being for this purpose in mesh with a pinion that is fixed to said higher number wheel. No carry-over pinions ever stand at the right of the master wheel, since all of the carrying is done toward the left, proceeding from the master wheel. During the relative step-by-step movements between the number wheels and the gang of carry-over pinions, the latter move successively into engagement with different number wheels, but there are always carry-over trains ready for operating on all the number wheels of higher denomination than that which is engaged by the master wheel at any time.

According to one feature of the present invention, the lowest carry-over pinion, that is, the one immediately to the left of the master wheel, is provided with a leftward annular extension forming a sleeve on which the higher carry-over pinions are mounted, with provision for a frictional drive between the sleeve and each of these higher carry-over pinions. These pinions normally revolve idly, but when a number wheel is moving from "9" to "0" it couples the next higher number wheel to one of said pinions. The lowest pinion is, of course, actuated each time a carry-over is effected by the rotation of the master wheel and when, at such time, other carry-overs among the higher orders are required, part or all of the torque needed to enable the respective pinion to drive the respective number wheel is furnished through the frictional drive between the sleeved lowest pinion and the pinion in question.

Each number wheel or computing wheel has a carry-over tooth which may resemble the carry-over tooth common in this art, and may rotate into mesh with the teeth of one of the carry-over pinions. The lowest or right-hand pinion, of course, rotates with every carry-over, and since this pinion is driven from the master-wheel-driven numeral wheel, the lost motion in driving said sleeved pinion is negligible. By virtue of the frictional drive between this sleeved pinion and the pinions carrying to higher orders, a substantially simultaneous carry may be effected through the entire series of denominations, without danger of an insufficient rotation of the highest numeral wheels. Since it becomes unnecessary to rely very much upon the usual spring detent or justifier to complete the movement of the highest wheels, it follows that the labor of rotating a large number of wheels simultaneously at a carry-over operation may be reduced, so that it becomes more feasible to operate the number wheels by direct drive from the keys of a typewriter. When not driven the number wheels are normally locked by a bail universal to all of them, which, however, at the striking of any numeral key is released to permit the rotation of any number wheel which happens to be in register with the master wheel. Other locks, however, come into play for all number wheels above the master-wheel-engaging number wheel, which will yield under control from the number wheel next below when the latter comes to zero, so as to enable a tens-carrying operation.

Other features and advantages will hereinafter appear.

In the accompanying drawing,

Figure 1 is a view similar to Fig. 3 of said Patent No. 1,045,434, but showing the present improvements applied thereto.

Fig. 2 is a part sectional view to illustrate the details of the carry-over trains.

Fig. 3 is a perspective view of master wheel, sleeved carry-over pinion and one of the higher recessed carry-over pinions, together with a preferred form of frictional drive between the sleeved pinion and the recessed pinion. In this view the parts are partly disassembled.

Fig. 4 is a sectional side elevation illustrating the position of the parts at the beginning of a carry-over operation.

Fig. 5 is a view similar to Fig. 4, and illustrating the position of the parts at the completion of a carry-over operation.

Fig. 6 is a part sectional view similar to Fig. 2, but illustrating a modification.

Fig. 7 is a detail of Fig. 6.

In Fig. 1 is shown a master wheel 1 fixed upon a revoluble shaft 2, driven by a gear 3, as shown in said above-mentioned patent, to which reference is made for explanation of features not shown or explained herein. This gear 3 may connect to the numeral keys of a typewriter, or to other source of power, for driving the master wheel shaft 2 variable extents, as determined by the numeral keys operated. Step-by-step feeding movement is effected between the master wheel 1 and a gang of number or computing wheels 4 by means disclosed in said patent; said master wheel meshing in succession with gears 5, each fixed to a number wheel, for turning the same.

The carrying from number wheel to number wheel is effected by idle wheels or pinions 6, 7, loosely mounted, and meshing with the gears 5 to drive the latter. In other words, the idle pinions 6, 7, may form a connection between one number wheel and the number wheel of next higher denomination. On each number wheel may be provided a carry-over tooth 8, which once in each revolution will mesh with an idle pinion 6, 7, whereby the latter is caused to rotate and hence drive the gear 5 of the next higher number wheel, thus advancing the latter one point.

The idle pinions are journaled on the master wheel shaft 2, and form a bank or gang, relatively to which there is effected the usual step-by-step movement of the number wheels 4, as explained in said patent, whereby the master wheel 1 may operate successively upon the number wheel gears 5, and whereby all of the gears 5 which are at any time to the left of the master wheel 1 are in mesh with idle carry-over pinions 6, 7; those number wheels at the right of the master wheel, as seen at Fig. 2, not needing any carry-over trains.

Where the number wheels are very numerous, difficulty is likely to arise in the carry-over operation, owing to the desirability of having all of the parts loosely fitted in order to economize in manufacture. This difficulty is due to the accumulation of play in a long train of gearing, with the result that if it be attempted to carry on all number wheels at the same time, the highest wheel in the gang might fail to turn far enough. This difficulty, of course, would not occur where there are only a few number wheels in a totalizer. One of the methods heretofore adopted for overcoming this difficulty is to use spring detents or justifiers 8ª which bring the number wheels to proper positions. In order to avoid the necessity of relying wholly or mainly upon these spring detents (although it is obvious that spring detents may be used on the number wheels here shown, if desired), and to guard against the above-mentioned difficulties and insure proper carrying at all times, the present invention provides a frictional drive between the carry-over pinion 7 adjacent the master wheel, and the carry-over pinions 6 to the left of this lower-order carry-over pinion 7. This is preferably effected by providing upon the lowest-order pinion 7 a leftwardly extending sleeve 9 fitting loosely about or journaled on the master wheel shaft 2. Loosely mounted upon or journaled on this sleeve, between the pinion 7 and a suitable retaining flange 10 revoluble with the sleeved pinion 7 (Figs. 1 and 2), are the carry-over pinions 6, each cut away or rabbeted as at 11 (Fig. 3) to provide space for a radially expanding leaf spring 12, one end 13 of which is frictionally mounted on and bears against the sleeve 9, the outer end 14 of each spring bearing against the outer wall 15 of the recess 11, in such a way as to transmit a limited torque from the sleeve 9 to the pinion 6 whenever the lowest carry-over pinion 7 integral with the sleeve is rotated to effect a carry-over. The function of these frictional devices 12 is to drive one point a number of the wheels of higher denomination than the wheel above the one opposite the master wheel; the wheel directly above the master wheel is driven in the carry-over operation through the sleeved pinion 7 from the carry-over tooth 8 of the numeral wheel in engagement with the master wheel, and in this drive, the lost motion is so small as to be negligible. In order, however, to prevent the accumulation of successive lost motions when the carry-over extends through a number of denominations, the friction drive between the lowest pinion and the higher pinions is provided. In this way there can be no lagging back of the higher wheels, and hence tens can be substantially simultaneously carried on all of the number wheels without encountering the difficulty above explained.

From the foregoing, it will be seen that when the drive shaft 2 and the master wheel 1 are rotated, the gear 5 in mesh with the master wheel is turned accordingly, together with its number wheel 4; and that thereupon the gang of number wheels 4 is advanced to bring the succeeding gear 5 into mesh with the master wheel 1, as explained in said patent. Whenever any number wheel 4 is completing a rotation, its carry-over tooth 8 meshes with one of the idle pinions 6, 7; and through the toothed engagement between the pinion 6 or 7 and the next higher numeral wheel gear 5, the latter is turned one point, while the parts move from the Fig. 4 position to the Fig. 5 position, or vice versa. If several of the number wheels stand at "9" when carrying takes place, the frictional drive from the sleeved pinion 7 to the higher pinion 6 becomes important, because full strokes of all the number wheels in moving from "9" to "0" are thereby secured, and no difficulty arises even if there is looseness of the parts. Owing to the avoidance of the necessity for depending mainly on spring detents, the operation of the wheels is bound to be very light, thus making the invention very desirable for use with key-driven number wheels; although it is obvious that light spring detents or justifiers 8ª may be employed in connection with the present invention, if found desirable for any reason.

While it is preferred to have the idle pinions on the same shaft as the master wheels, it will be understood that this is not necessary in all cases so long as the higher pinions 6 are mounted to coöperate suitably with the lowest pinion 7.

When it is desired to effect subtraction, the direction of rotation of the master wheel shaft 2 may be reversed and other computations may be performed, as explained in said patent. When subtraction is being performed, the carry-over teeth 8 serve as couplers, in the manner already explained in connection with addition.

Normally, all the number wheels 4 are locked against rotation when none of the numeral keys are actuated, by a bail 18 universal to all of the number wheels 4, and arranged to engage between the teeth of the gears 5. The bail 18 is secured to a rock shaft 19, held by a spring 20 in such a position that the bail 18 will engage between teeth of the gears 5, preventing any rotation whatsoever until a numeral key is struck. When a numeral key is actuated, a locking dog 21, which is similar to the locking dog 54 described in the above-mentioned patent, will not only come between the teeth of a rack 22, but will also engage a bail 23 extending the full length of the series of number wheels. The bail 23 is secured to the shaft 19, so that the dog 21 will rock the shaft 19 against the tension of the spring 20, thereby moving the bail 18 out of engagement with all of the gears 5, permitting the number wheels 4 to rotate.

One of the number wheels 4 will be in register with the master wheel 1, so that it may be rotated directly. It is, however, desirable to prevent any rotation of all higher number wheels except a tens-carrying movement of one step. For this purpose, there is provided a series of pawls or dogs 24, each pivotally mounted as at 25, on a floating lever 26 pivoted at 27. The floating lever 26 for the number wheel 4 in register with the master wheel is free to rise and fall, thereby permitting the dog 24 to be cammed out from between the teeth of the associated gear 5. The floating levers 26 for all higher number wheels, however, are locked against upward movement by a stationary locking bar 28, which extends just short of the master wheel 1, along the number wheels 4, so as to take in all of the number wheels which extend above the particular one in register with the master wheel.

Now, then, the only way in which the dogs 24 can release their number wheels 4, is by rocking about their pivots 25; this is prevented in all cases except during a carry-over. To do this, each dog has a tail 29 which projects to such a position that it will contact with and overlie the number wheel next lower in denomination to the one which it locks. Normally, this tail 29 rides on the surface of the next lower number wheel so that the dog 24 cannot rock out from between the teeth of the gear 5 of this number wheel 4.

When, however, a number wheel of lower denomination comes to such a point that it will exhibit "0," that is, as it makes a complete revolution, the tail 29 under the influence of gravity or by the camming action of the wheel 5 on its tooth 24, may drop into a depression 30 found in this number wheel, so that as the tens-carrying mechanism, including a carry-over tooth 8 and a carry-over wheel 6 or 7 acts, the dog 24 will be free to swing about its pivot 25 to permit merely a one-step movement of its number wheel which is next higher in denomination to the number wheel just having completed a revolution. As soon as zero is passed in this number wheel of lower denomination, the tail 29 rides out of the depression 30 onto the periphery of the number wheel, preventing any further rotation of the next higher number wheel.

We have, then, the number wheels locked at all times except when computing, that is, when a numeral key is in action, and also all number wheels of higher denomination than the particular number wheel in register with the master wheel locked, even when a computing operation is going on, except when the next lower number wheel is completing a revolution to effect a tens-carrying operation.

Inasmuch as this improvement is generally used in connection with a combined typewriting and computing machine, wherein the numbers are written at the same time that they are computed, allowance must be made for the punctuation or pointing off of spaces, as the numbers may be written thus,—999,999.99. That is to say, allowance must be made for the comma spacing the hundreds from the thousands, and the decimal point between dollars and cents.

To do this, the tens of cents wheel, indicated specifically at 31 (Fig. 2), and the hundreds of dollars wheels, indicated specifically at 32, are made double the width of the other number wheels. On these broad number wheels 31 and 32, the tens-carrying tooth 8, which acts as a coupler, is located at the extreme left of each broad number wheel, so as to stand clear of an intermediate carry-over wheel, thereby allowing for the increased width, and carrying properly to the next higher number wheel. There will then be several of the carry-over wheels 6, 7, idle at any particular moment, and, in fact, as the computing head or totalizer as a whole travels, all of the carry-over wheels 6, 7, will be idle at some time or other.

In order to prevent accidental rotation of these idle carry-over wheels, 6, 7, when not in mesh with any of the gears 5, and in order to hold them in a justified position ready to come into mesh with the gears 5 at a subsequent relative movement, there are provided a plurality of locks 33 and 34, one for each punctuation space allowed for. These locks 33 and 34 travel with the series of number wheels 4, and are located so as to come into engagement with whatever carry-over wheels 6, 7, are in register with the spaces corresponding to the extra width of the number wheels allowing for the punctuation marks.

In the modification illustrated in Figs. 6 and 7 the leaf springs 12, expanding radially outward, are replaced by torsion springs 41 mounted to exert an axial force of expansion between each of the higher carry-over pinions 6 and the flanged portion 42 of the sleeve 43 associated therewith. These flanged sleeves 43 are splined as at 44 to the sleeved pinion 7 adjacent the master wheel 1. Axial expansion of the carry-over devices is limited by a flanged sleeve 10 revoluble with and fast to the sleeved pinion 7. As will be clear from Figs. 6 and 7 of the drawings, the operation of this embodiment is the same as that of the preferred embodiment of Figs. 1 to 5, except that in Figs. 6 and 7 the springs 41 exert a force axially of the master wheel shaft 2 to effect a frictional drive between the higher carry-over pinions 6 and the flanged sleeves 43 revoluble with the sleeved pinions 7, whereas in Figs. 1 to 5, the springs 12 exert a pressure radially of the master wheel shaft 2 to effect a frictional drive between the higher pinions 6 and the sleeved pinion 7 directly.

It is thus evident that in both of the illustrated embodiments of the invention, the carry-over will take place without fail from the lowest number wheel to the highest, even when all are going from "9" to "0" at the same time, and that all of the parts will be locked against accidental action when not being positively driven, or when their time for action has not arrived.

Variations may be resorted to within the scope of the invention, and portions of the improvements may be used without others.

Having described my invention, I claim:

1. In a computing machine, the combination with a series of computing wheels, of a rotatable driving member, means for rotating said driving member during each carry-over operation, carry-over wheels, a frictional driving connection from said driving member to each of said carry-over wheels, and a coupler secured to each of said computing wheels adapted to establish, through an opposite carry-over wheel, a driving connection to an adjacent computing wheel of next higher order.

2. A computing apparatus combining a series of computing wheels, a gear for each of said computing wheels, carry-over wheels arranged to mesh with said gears, a sleeved member, means for rotating said member during a carry-over, a shaft extending loosely through said member for so rotating it, means for frictionally mounting said carry-over wheels on said member, and a coupler on each of said computing wheels arranged to mesh with one of said carry-over wheels.

3. A computing apparatus combining a series of number wheels, a series of carry-over wheels for said number wheels, a sleeved member rotating during each carry-over and extending loosely through said carry-over wheels, and a frictional drive between said member and each of said carry-over wheels.

4. A computing apparatus combining a series of number wheels, a member rotating during each carry-over, a series of carry-over wheels sleeved on said member, a shaft extending through said member, springs frictionally connecting each carry-over wheel with said member, said carry-over wheels being rabbeted to form a casing in which said springs are mounted, and couplers on said number wheels engaging said carry-over wheels.

5. In a computing machine, the combination with a series of computing wheels and a master wheel to operate said computing wheels in succession, of means for locking each computing wheel of higher order than the one at any time engaged with the master wheel, said locking means for each computing wheel being rendered ineffective while its neighboring computing wheel of next lower order is passing from its nine position to its zero position, a primary carry-over wheel to be brought into coöperative relation with each computing wheel as it is engaged by the master wheel, a series of auxiliary carry-over wheels to be brought successively into coöperative relation with computing wheels of higher order than the one engaged by the master wheel as the master wheel is successively brought into coöperative relation with computing wheels of lower and lower order, means for driving each computing wheel from a carry-over wheel opposite a computing wheel of next lower order, means for driving the primary carry-over wheel from the computing wheel engaged by the master wheel as said computing wheel passes from its nine position to its zero position, and a frictional driving connection between the primary carry-over wheel and each of the auxiliary carry-over wheels, whereby each carry-over wheel having a driving connection with a computing wheel tends to rotate said computing wheel during each carry-over operation, and does rotate such of said computing wheels as are released by their locking devices.

6. In a computing machine, the combination with a series of computing wheels and a series of numeral keys, of key-driven carry-over mechanism for said computing wheels, parts of said key driven mechanism having a frictional driving relation with other parts thereof to reduce the cumulative effect of lost-motion during carry-over operations involving a number of successive computing wheels.

7. In a computing machine, the combination with a series of computing wheels, a master wheel for driving said computing wheels *seriatim*, a shaft for driving said master wheel, a series of carry-over wheels for said computing wheels, said master wheel and said carry-over wheels forming a unit, and frictional means for driving said carry-over wheels during each carry-over.

8. A computing apparatus combining a series of number wheels, a master wheel for driving said number wheels *seriatim*, a shaft for driving said master wheel, a series of carry-over wheels for said number wheels, a member rotating during each carry-over, and coupling means for frictionally gearing each of said carry-over wheels with said member during the carry-over operation.

9. In a computing machine, the combination with a series of computing wheels and a series of numeral keys, of key-driven carry-over devices for said computing wheels, and key driven frictional means tending to drive said carry-over devices simultaneously.

10. A computing apparatus combining a series of number wheels, a master wheel for driving said number wheels *seriatim*, a shaft for driving said master wheel, carry-over mechanism including a sleeved gear on said master wheel shaft and other gears frictionally mounted on the sleeved portion of the first gear, and coupling means for joining said gears together so as to limit the lost motion in a series carry-over to that normally in connection with one number wheel, by connecting said sleeved gear directly to the master-wheel-driven number wheel.

11. A computing apparatus combining a series of computing wheels, some of said computing wheels being of extra width to allow for punctuation spaces, a series of carry-over wheels of uniform width, a member on which said carry-over wheels are frictionally mounted, said member rotating during each carry-over and tending to drive the carry-over wheels, a coupler on each of said computing wheels for engaging the accordant carry-over wheel as the computing wheel passes through zero, the couplers for said extra-width computing wheels being spaced to render idle an intermediate carry-over wheel and thereby ineffective to couple such idle carry-over wheels at the time such idle carry-over wheels are in register with the extra width of said extra-width computing wheels, and means positively engaging said idle carry-over wheels to prevent accidental rotations thereof, and to maintain such idle carry-over wheels in justified positions.

12. A computing apparatus combining a series of number wheels, a carry-over mechanism for said number wheels including a member rotating during each carry-over, a series of carry-over wheels mounted on said member, and a spring for each of said carry-over wheels engaging said member and exerting a frictional force radially of the wheels, said springs being held in position by the next adjacent carry-over wheel.

13. A computing apparatus combining a series of number wheels, a master wheel for driving said number wheels *seriatim*, carry-over wheels, and a frictional drive between the carry-over wheel adjacent the master wheel and the other carry-over wheels for enabling a simultaneous series of carrying operations through said carry-over wheels from number wheels of lower denomination to the number wheels of next higher denomination.

14. A computing apparatus combining a series of computing wheels, a series of gears, means for frictionally driving the higher gears from the lowest gear in operation at the time, a master wheel for driving said computing wheels *seriatim*, said gears meshing with all computing wheels above the master wheel, an individual lock for each computing wheel controlled from the next lower computing wheel to prevent rotation by the engaged gear of the next higher computing wheel than the controlling computing wheel, and means for preventing the release of said individual locks for all computing wheels higher than the computing wheel being driven by said master wheel except when the next lower computing wheel controlling any individual lock is passing to zero in completing a revolution of such computing wheel.

15. A computing apparatus combining a series of computing wheels, each comprising a gear, a master wheel for driving said computing wheels *seriatim*, carry-over wheels of uniform width meshing with said gears, a frictional drive from the carry-over wheel adjacent the master wheel to each carry-over wheel of higher order, individual locks for said computing wheels controlled from the next lower computing wheel to prevent rotation of the next higher computing wheel than the controlling computing wheel, means for preventing the release of said individual locks for all computing wheels higher than the computing wheel being driven by said master wheel except when the next lower computing wheel controlling the individual lock is coming to zero in completing a revolution of such computing wheel, thereby holding locked each carry-over wheel in mesh with a computing wheel, some of said computing wheels being of extra width to allow for punctuation spaces, thereby leaving some of said carry-over wheels which are in register with the extra width of said extra-width computing wheels free from engagement with any of said gears, and locks for preventing rotation of such free carry-over wheels by said frictional drive.

16. In a computing machine, the combination with computing wheels and a master wheel for driving them, of carry-over wheels, a shaft for driving said carry-over wheels, a spring between each carry-over wheel and said shaft for enabling its wheel to be driven thereby, and a driving connection from said master wheel to said shaft through which said shaft is rotated during each carry-over operation.

17. In a computing machine, the combination with computing wheels and carry-over devices therefor, of a shaft for driving said carry-over devices, and a spring between each carry-over device and said shaft for selectively driving said carry-over devices.

18. In a computing machine, the combination with computing wheels and carry-over wheels, of a shaft for driving said carry-over wheels, and a spring for each carry-over wheel between its wheel and said shaft, and frictionally engaging both the shaft and the carry-over wheel.

19. In a computing machine, the combination with carry-over wheels and computing wheels, of means whereby each carry-over wheel is normally held locked, means normally tending to turn the carry-over wheel when any computing wheel is turned from its nine position to its zero position, and connections whereby any carry-over wheel which is to be effective, is unlocked to permit it to turn.

20. In a computing machine, the combination with computing wheels and a master wheel for driving them, of carry-over wheels, a shaft for driving said carry-over wheels, a spring between each carry-over wheel and said shaft for enabling its wheel to be driven thereby, and locking means adapted to be effective or ineffective for determining when the carry-over shall take place.

21. In a computing machine, the combination with computing wheels and carry-over devices therefor, of a shaft for driving said carry-over devices, a spring between each carry-over device and said shaft for selectively driving said carry-over devices, and locking means adapted to be effective or ineffective for determining when the carry-over shall take place.

22. In a computing machine, the combination with computing wheels and carry-over wheels, of a shaft for driving said carry-over wheels, a spring for each carry-over wheel between its wheel and said shaft, and frictionally engaging both the shaft and the carry-over wheel, and locking means adapted to be effective or ineffective for determining when the carry-over shall take place.

23. In a computing machine, the combination with a series of computing wheels, and a series of carry-over wheels, of a frictional driving connection from one carry-over wheel to other carry-over wheels of the series.

24. In a computing machine, the combination with a series of computing wheels and a primary carry-over wheel to which is imparted a carry-over step of rotation during each carry-over operation, of a series of auxiliary carry-over wheels, and a frictional driving connection from the primary carry-over wheel to each of the auxiliary carry-over wheels.

25. In a computing machine, the combination with a series of computing wheels, of a primary carry-over wheel to which is imparted a carry-over step when any computing wheel passes its carry-over position during a computing operation, and a series of auxiliary carry-over wheels, each carry-over wheel in position to take part in a computing operation having a driving connection with a computing wheel of next higher order, and each auxiliary carry-over wheel having a frictional driving connection from said primary carry-over wheel.

26. In a computing machine, the combination with a series of computing wheels, a series of numeral keys, and a series of key-driven carry-over wheels, of a common driving member for a plurality of said carry-over wheels, said driving member being driven by the keys and having a constantly effective frictional driving connection with said carry-over wheels.

HENRY L. PITMAN.

Witnesses:
W. O. WESTPHAL,
DELOS G. HAYNES.